US011437056B1

(12) United States Patent
Alonzo, III

(10) Patent No.: US 11,437,056 B1
(45) Date of Patent: Sep. 6, 2022

(54) VEHICLE SOUND ANALYSIS

(71) Applicant: United Services Automobile Association (USAA), San Antonio, TX (US)

(72) Inventor: Edward Manuel Alonzo, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 16/809,356

(22) Filed: Mar. 4, 2020

Related U.S. Application Data

(63) Continuation of application No. 15/662,219, filed on Jul. 27, 2017, now Pat. No. 10,629,224.

(60) Provisional application No. 62/367,937, filed on Jul. 28, 2016.

(51) Int. Cl.
*G10L 25/51* (2013.01)
*G06F 16/951* (2019.01)
*G06F 16/683* (2019.01)
*G10L 25/72* (2013.01)

(52) U.S. Cl.
CPC ............ *G10L 25/51* (2013.01); *G06F 16/683* (2019.01); *G06F 16/951* (2019.01); *G10L 25/72* (2013.01)

(58) Field of Classification Search
CPC ....... G10L 25/51; G10L 25/72; G06F 16/683; G06F 16/951; G01S 5/18; G01S 3/80; G01H 1/00; G11B 2020/10546; G11B 20/10527; G06Q 10/063114; G06Q 50/30; G08G 1/166
USPC ........................................................ 707/769
See application file for complete search history.

(56) References Cited

U.S. PATENT DOCUMENTS

| | | | |
|---|---|---|---|
| 2010/0057290 A1* | 3/2010 | Brillhart | G06Q 10/06 701/31.4 |
| 2011/0288909 A1 | 11/2011 | Hedley et al. | |
| 2013/0141230 A1* | 6/2013 | Chandler | B60Q 1/00 340/455 |
| 2013/0211662 A1* | 8/2013 | Blumer | G06Q 30/0201 701/31.4 |
| 2014/0074345 A1* | 3/2014 | Gabay | G07C 5/08 701/31.4 |
| 2014/0122988 A1 | 5/2014 | Eigner et al. | |
| 2016/0142820 A1 | 5/2016 | Kraft et al. | |
| 2016/0150333 A1 | 5/2016 | Goldstein et al. | |
| 2017/0148467 A1 | 5/2017 | Franklin et al. | |
| 2017/0193825 A1 | 7/2017 | Schlechter et al. | |
| 2018/0240025 A1* | 8/2018 | Vasters | G08G 1/005 |

* cited by examiner

*Primary Examiner* — Evan Aspinwall
(74) *Attorney, Agent, or Firm* — BakerHostetler

(57) ABSTRACT

The disclosure generally relates to collecting and analyzing audible signals produced by a system. Audio segments and metadata can be received and compared. A closest match and deviations can be determined based on the comparison. Based on this analysis, a condition of the system during its operation can be determined.

19 Claims, 5 Drawing Sheets

VEHICLE SOUND ANALYSIS

CROSS-REFERENCE TO RELATED APPLICATIONS

This patent application is a continuation of and claims priority to and the benefit of U.S. patent application Ser. No. 15/662,219, filed Jul. 27, 2017 and claims priority to and the benefit of provisional patent application 62/367,937 filed Jul. 28, 2017, both of which are incorporated herein by reference in its entirety.

TECHNICAL FIELD

Aspects herein generally relate to collecting and analyzing sound, and more particularly relate to identifying vehicles based on captured portions of sound.

SUMMARY

In an embodiment, a method comprises detecting a new audio segment and comparing the new audio segment with known audio segments in an audio database. If a closest match can be found, the method comprises identifying a closest match to the new audio segment from the known audio segments. If a closest match cannot be found, the method comprises creating a new entry in the audio database.

In an embodiment, a system comprises a communication module for receiving new audio segments and new metadata from a sensor, and an analysis module configured to analyze the new audio segments and the new metadata in relation to stored audio segments and metadata.

Additional and alternative aspects will be apparent on review of other portions of this disclosure.

BRIEF DESCRIPTION OF THE DRAWINGS

So that those having ordinary skill in the art, to which the present invention pertains, will more readily understand how to employ the novel system and methods of the present invention, certain illustrated embodiments thereof will be described in detail herein-below with reference to the drawings, wherein.

A component or a feature that is common to more than one drawing is indicated with the same reference number in each of the drawings.

DETAILED DESCRIPTION

Figure 1:
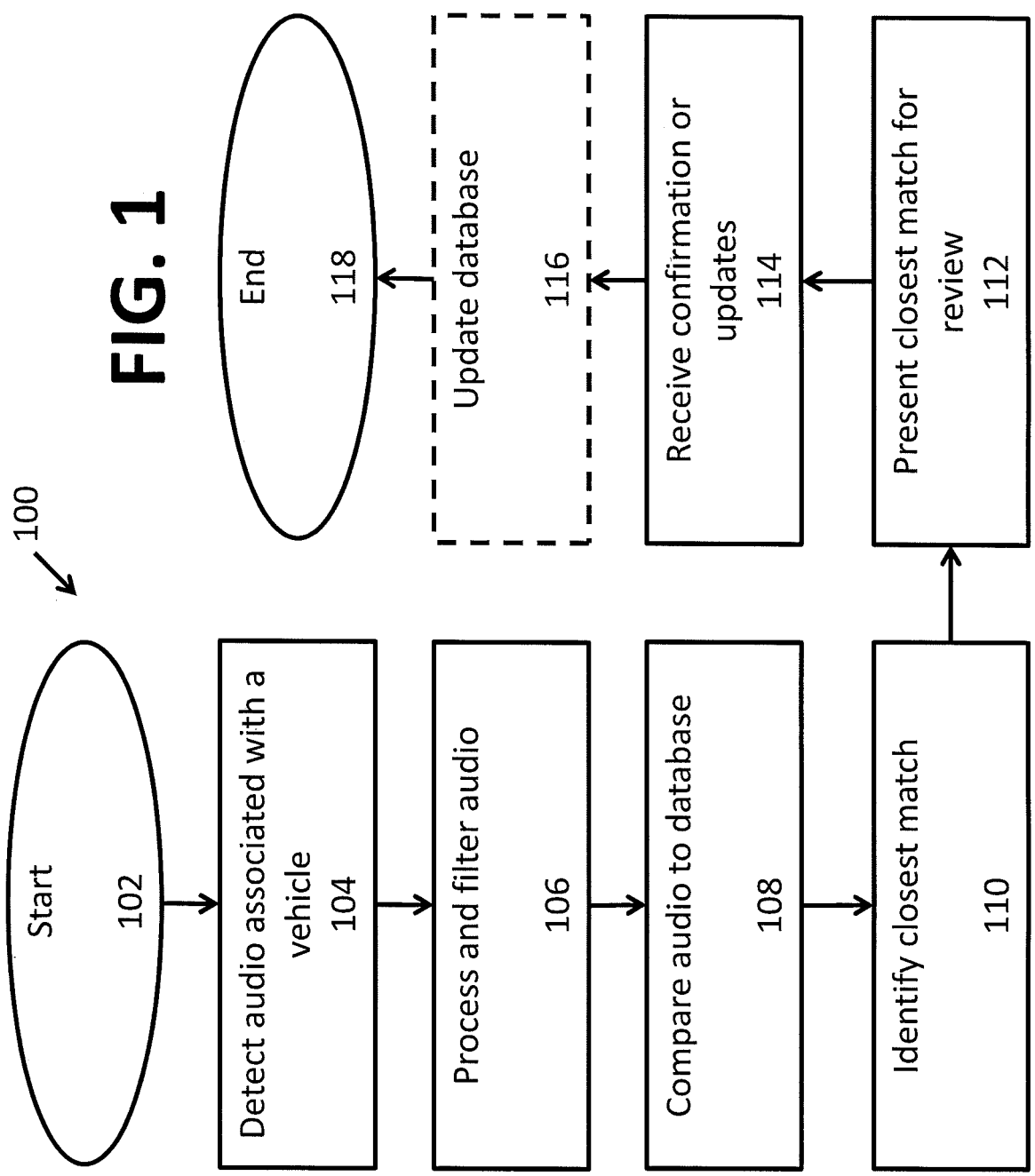
FIG. 1 is a flowchart of a methodology depicting illustrative operation of one or more embodiments described herein.

The present disclosure is generally directed to collection and analysis of audio signals.

Many motor sports enthusiasts enjoy and recognize the sounds generated by vehicle engines and other components. Some go so far as to select vehicles or parts for vehicles based on sound. Vehicle sounds are not arbitrary but a product of design and function and therefore can be associated with particular vehicles. For example, motorcycle "pipes" can be exchanged to provide a particular sound profile, or a street racing car muffler may be selected to increase or decrease noise made during driving.

In this regard, databases can be built of vehicle sounds. The databases can aggregate recorded vehicle sounds. The recorded vehicle sounds can be processed to remove non-vehicle noise and standardize audio to aid in comparison and analysis. Different portions or types of recorded audio can also be identified, such as idling sound, acceleration sound, and deceleration sound. In embodiments, sounds inaudible to the driver or spectators or vibrations may be captured by recording devices more sensitive than the human ear. Collected audio can be stored and analyzed. In embodiments, a cellular phone gyroscope, accelerometer, or similar device can be used to capture vibrations or movements of a vehicle which can be analyzed separately, or be used to process or combined with the audio recording.

A vehicle can be identified and associated with its sound or sounds. Deviations to these sounds can be accounted for based on particular modifications, operating conditions (vehicular or environmental), et cetera. For example, an aftermarket muffler, a particular tire tread, a failing belt, a gravel road, improper ignition timing, worn shocks, or rain can modify the aural signature of a particular vehicle. These auditory components can be identified in the analysis to more accurately identify the vehicle and its current status regardless of environment.

The database can be refined through learning algorithms or user input regarding recorded audio. In various embodiments, audio is submitted with information about a vehicle by a recorder. Subsequent audio can be analyzed and a closest match identified, which can then be updated by machine learning or a user to expand and improve the database. In embodiments, a closest match cannot be identified and a new entity can be created in the database.

The vehicle sound database can be leveraged for a variety of uses. In an embodiment, service providers offering products relating to vehicles can pre-populate vehicle information based on identifying the audio heard. For example, an insurance provider can "listen" to a motorcycle and guess the vehicle to be insured, populating the insurance application with information regarding the vehicle identified to ease and expedite the application process. In another example, an auto parts seller can analyze audio of a race car and provide a product filter or list matched to the race car.

In additional embodiments, audio of a vehicle can be used to verify details provided as to its model, modifications, or condition. For example, if a lender or insurer needs verification that a vehicle remains in stock condition and has been properly maintained, analysis of an audio signal is more efficient than inspecting the vehicle. Further, interest or insurance rates can be modified based on the vehicle condition or modifications. For example, the use of premium tires, especially in inclement weather, or consistent maintenance may increase confidence in the owner, thereby reducing associated risk and rates based thereon. Further, audio of vehicles can be used to track vehicle performance, detecting aspects such as rapid acceleration or losses of wheel traction. Behavior inferred from such audio may also be used by lenders, insurers, or other interested parties. Behavior-based insurance hardware, software, and techniques can integrate with or utilize sensor data or other information herein to aid in insurance rate calculations. Monitoring for insurance or other purposes can be continuous or episodic.

In additional embodiments, diagnostics or tuning can be improved using vehicle audio. By listening to a vehicle and discovering deviations, problems can be identified. These diagnostics via audio analysis can be used by mechanics, owners, or others to determine condition or repair vehicles.

Entertainment can also be realized through the vehicle audio database. The vehicle audio database can permit users to test their knowledge of vehicle audio by playing vehicles back and allowing them to guess, or allow submission of new or modified vehicles unknown to the database and allow others to guess as to the identity.

A variety of other embodiments are also possible. Parties shopping for vehicle parts can be provided example sounds representing the changes to the vehicle's aural signature once the modifications are complete, or parties shopping for vehicles can more generally hear the vehicle's aural signature with or without modification. These can be shown on a screen, in a holograph, in virtual reality, et cetera. Car censuses can be conducted which identify passing vehicles based on a static or mobile microphone to determine more accurate traffic numbers relating to the number of vehicles and their individual types and condition. Vehicular and pedestrian traffic can be analyzed. Individual vehicles can be tracked based on their "acoustic fingerprint" using distributed or mobile listening devices to assist law enforcement or intelligence with tracking a vehicle without following in chase.

Car-specific advertising can be provided on dynamic advertisement using directional microphones to detect vehicle types in advance and provide advertising content keyed to the vehicle (e.g., a luxury car receives different advertising than an economy car). In embodiments, "microauctions" can be conducted for advertisers, displaying the highest bid ad, based on audio data (and/or other sensor data, such as visual data) for individual vehicles or aggregated vehicle data at particular times and places. Instantaneous/real-time ad time, or future ad time based on statistics, could accordingly be sold or auctioned. The ad pricing can be based on time of day, exposure time per vehicle, vehicle speed(s), vehicle position, vehicle angle of approach, et cetera. Specific audiences can be identified, with ad(s) displayed for the specific audience (down to an individual vehicle) transitioning to different advertisements when the specific audience is beyond billboard view or if they are outbid. In an embodiment, a holographic or multi-angle billboard could be employed to target individual vehicles or groups of vehicles based on their relative position. The multi-angle billboard can be employed using a variety of lenses and mirrors, which can be static or movable, to provide multiple ads per billboard based on viewing location.

Noise cancelling features built into vehicles can be made more accurate based on the known aural signature(s) associated with the vehicle. Alternatively, noise generation can be provided for a designer vehicle where a specific vehicle noise is sought but not created by the vehicle itself (e.g., vehicle runs quiet but can broadcast loud exhaust noise selectively). In addition, a vehicle sound database can be leveraged to simulate vehicle rides or immersive experiences (alone or in combination with other data such as that collected by a gyroscope, accelerometer, or other sensors in a vehicle), or improve the accuracy and quality of movies or other replayable media involving vehicles.

In embodiments, user vehicles or devices can participate in development of the database. For example, vehicle sensors or user mobile devices can provide audio information, location information, diagnostic information, et cetera. This information can be associated with vehicles and collected audio data in the vehicle database. Based on this information, more accurate details as to the vehicle can be developed, and algorithms using machine learning or other techniques to aid in identifying vehicles and their conditions can be improved by using multiple datapoints the same point in time for one vehicle.

Aspects herein can be accomplished with an application on a mobile phone, tablet, computer, or other device. A recording module can use a microphone or other audio recording component to collect audio data. An analysis module can analyze the audio data to determine characteristics for identifying a vehicle or components thereof. The database is used to store audio data for analysis and comparison, and may be updated with new audio data as it is provided. A processing module may also be provided to process recorded audio for noise reduction, standardization, and so forth. In embodiments, one or more modules can be located remote to the user's device, establishing a client server relationship. For example, the database and some or all of the analysis module may be located on third party servers to provide storage for large amounts of audio data as well as increase processing power available for analysis.

It is to be appreciated the subject invention is described below more fully with reference to the accompanying drawings, in which illustrated embodiments of the present invention are shown. The present invention is not limited in any way to the illustrated embodiments as the illustrated embodiments described below are merely example of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, example methods and materials are now described.

It must be noted that as used herein and in the appended claims, the singular forms "a," "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth.

It is to be appreciated that certain embodiments of this invention as discussed below are a software algorithm, program or code residing on computer useable medium having control logic for enabling execution on a machine having a computer processor. The machine typically includes memory storage configured to provide output from execution of the computer algorithm or program. As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the invention based on the above-described embodiments. Accordingly, the invention is not to be limited by what has been particularly shown and described, except as indicated by the appended claims. Further, although at least one series of steps are presented as an example method of practicing one or more embodiments described herein, it will be appreciated by those skilled in the art that the steps identified may be practiced in any order that is practicable, including without limitation the omission of one or more steps.

Nonetheless, aspects herein which may be implemented in software need not be, and can be realized according to non-software techniques unless explicitly described otherwise.

Figure 2:
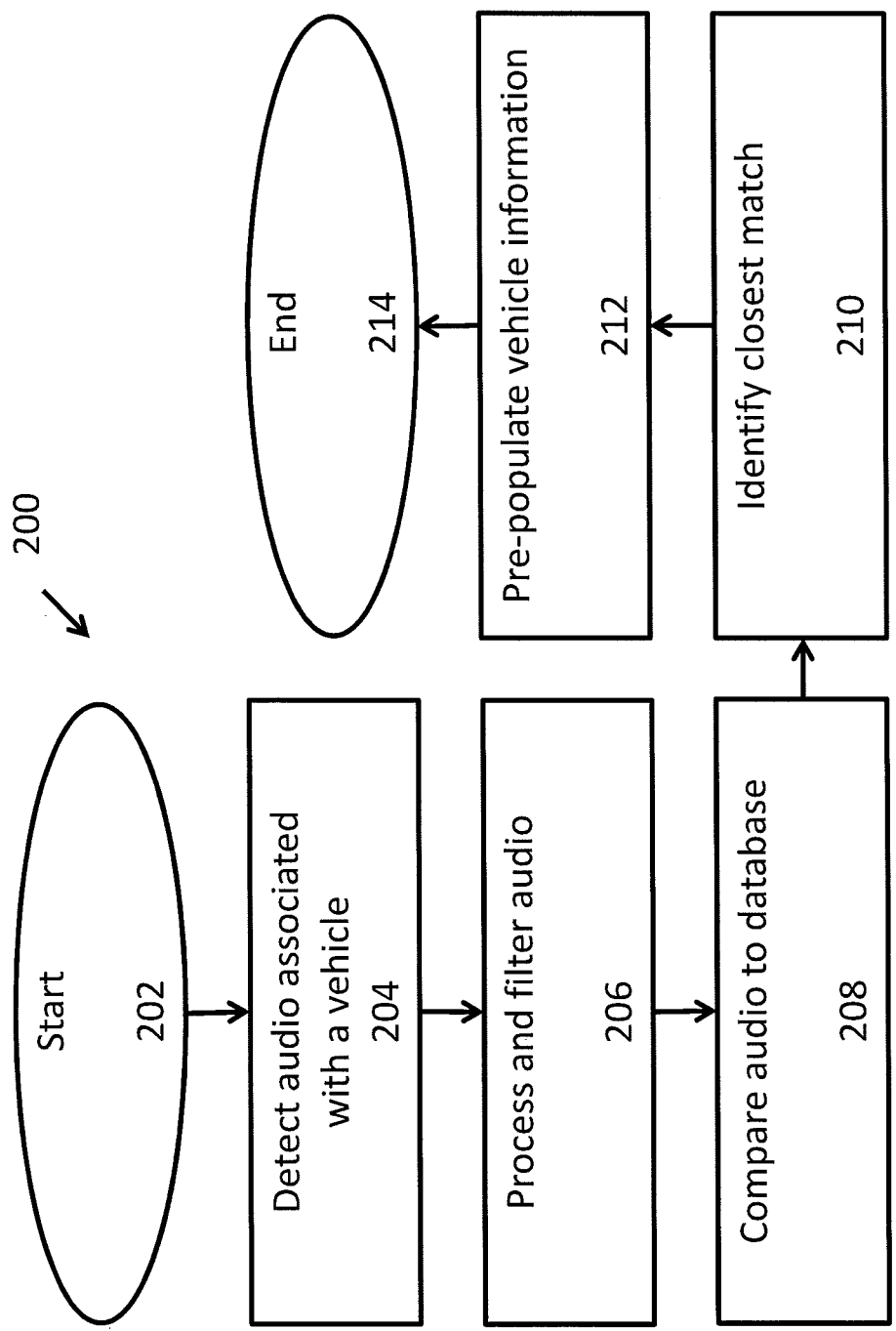
FIG. 2 is a flowchart of a methodology depicting illustrative operation of one or more embodiments described herein.
Figure 3:
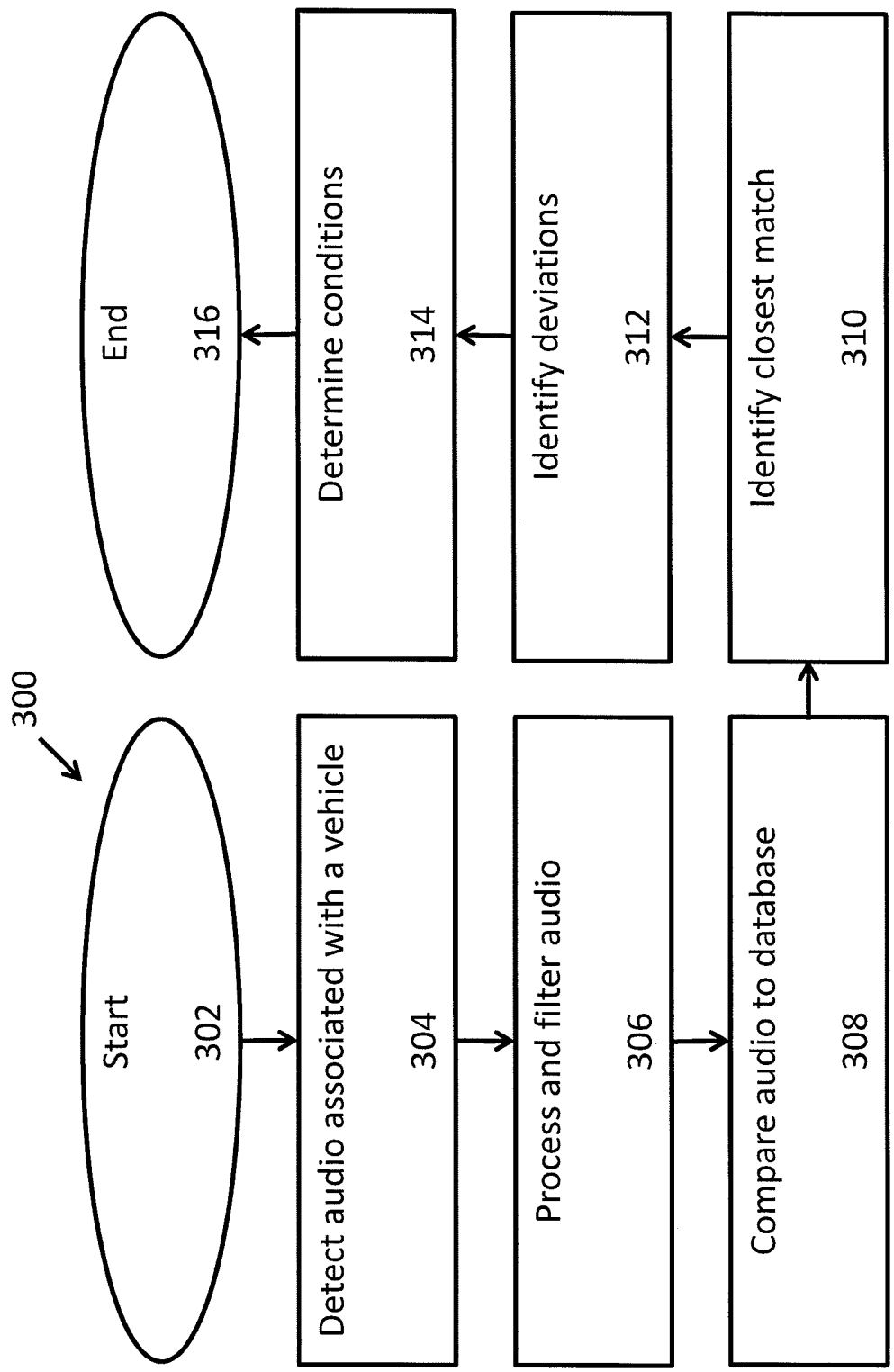
FIG. 3 is a flowchart of a methodology depicting illustrative operation of one or more embodiments described herein.

Turning to the drawings, FIGS. 1-3, depict example methodologies 100, 200, and 300 for utilizing one or more embodiments described herein. FIG. 5 illustrates an example block diagram of a system 500 for implementing one or more aspects herein. A computing device 400, such as that shown in FIG. 4, may interface with one or more computing devices that include data identifying one or more accounts (or users, vehicles, et cetera) and/or comprising data collected or analyzed in relation thereto. Such data may be received by an interface device 404 and may be displayed through an output device connected to and interface device 404. Such data may be stored in a memory device 410. Alternatively, such data may be stored elsewhere, such as in a network cloud, and sent to or retrieved by computing device 400 to execute the processes described herein.

Specifically, computing device 400, components thereof, or alternative electrical or electronic components may be employed to collect, send, and/or receive data in accordance with aspects herein. Such components can include mobile phones or other mobile devices, apps installed thereto, and sensors (e.g., location-sensing hardware, gyroscopes, accelerometers) aboard or leveraged by such mobile devices or apps. Data aggregated from one or more points can be transferred over networks to assist with analyzing audio data. Internet of Things (IoT) devices, or sensors or components compatible with IoT technologies can also be employed with aspects herein alone or in combination with audio collection devices utilized by a user. In embodiments, sensors (e.g., microphones, gyroscopes, accelerometers) aboard vehicles (e.g., within the passenger compartment, on the engine, elsewhere on a vehicle) can be used to collect sensor data. Other sensors external to processing or communication devices can also be employed. Further, an app stored in memory or employed in a distributed fashion may be employed for collecting and submitting audio for analysis.

Also referring to FIGS. 1 to 3, example methods of operating computing device 400 will be described herein. However, aspects of these methods, or the methods in their entirety, may be performed without the use of computing device 400 or similar devices.

Referring specifically to FIG. 1, the flow chart illustrates an example methodology for matching vehicle sounds and maintaining a database of vehicle sounds for matching. Methodology 100 begins at 102 and proceeds to 104 where audio associated with a vehicle is detected. This can be using a static microphone, a movable microphone part of a mobile device or computer, microphones aboard the vehicle capable of interacting with external systems, and so forth. Detection can be automatic based on continuous monitoring or on demand based on automatic or manual action. In an embodiment, a user may use a control on a mobile app to begin recording or transmit audio.

At 106, methodology 106 processes and filters the audio. This aspect may not be included in all embodiments, but can be provided to reduce noise, standardize audio format, normalize the audio data, and so forth, which provides for standardization in the database and improve analysis consistency.

At 108, the audio received is compared to audio in the database. This can be done over the entire audio data or using specific points of audio data represented according to parameters or waveform. Aspects such as peaks and troughs of the waveform, the presence and amplitude of particular frequencies, overall frequency or period length, and others, can be compared. Transformations or augmentations associated with modifications or particular conditions can be applied to determine whether a modified (or de-modified) version is a closer match than audio comparisons for a stock vehicle or average condition.

Based on this comparison and analysis, at 110 a closest match is identified. In an alternative embodiment, no closest match is identified, and a new entry can be created in the database.

In methodology 100, the closest match is then provided to the submitting user for review. At 114 confirmation of its correctness or updates (to model, modifications, et cetera) can be provided to properly match the vehicle to the provided audio data. If such updates are provided, at 116 the database is updated to include the new audio for future matching. Alternatively the audio could be associated or merged with data regarding similar or identical vehicles to improve a model for comparison and matching. For particular variants or vehicles with "mods," further processing can occur to improve the machine learning and analysis conducted through interpolation of distinct models or variants based on the sound and information provided. Thereafter, methodology 100 ends at 118.

FIG. 2 illustrates a flow chart for an example methodology 200 for using vehicle audio to pre-populate information related thereto. Methodology 200 begins at 202 and proceeds to 204 where vehicle sound is detected or provided. In embodiments, pre-recorded sound can be provided in addition to sound which is live or recorded on demand using a mobile or pre-positioned device. The device may include local processing capability, components for transmitting the sound or data representative thereof over wired or wireless means, or combinations thereof. At 206 the sound may be processed and filtered to reduce or remove noise, amplify or suppress particular frequencies or aspects, normalize the gain or amplitude, standardize the format, et cetera. Thereafter, at 208, the (raw or unprepared) audio may be compared or analyzed in view of known audio. At 210, the closest match is identified. Based on this closest match, vehicle information can be pre-populated into various forms or systems for use or review by the insurer, the insured, or other parties. Thereafter, at 214, methodology 200 ends.

FIG. 3 illustrates a flow chart for an example methodology 300 determining conditions associated with vehicle operation. Methodology 300 begins at 302 and proceeds to 304 where audio of a vehicle is detected. At 306, the audio may be processed or filtered in preparation for transmission, storage, or analysis. Thereafter, at 308, the audio is analyzed and/or compared to known audio in the database, with a closest match identified at 310.

Based on the closest match, at 312, deviations are identified. The deviations can then be identified to determine vehicle conditions. Vehicle conditions can include modifications to the vehicle, vehicle operating condition (e.g., engine trouble, tire tread), environmental operating condition (e.g., road surface, weather), and so forth. The conditions identified can provide further information about the vehicle, its use, or the driver.

As will be appreciated, methodologies 100, 200, and 300, and alternatives described, can be combined in various fashions to effect establishment, maintenance, and use of an audio database and analysis of audio leveraging such.

Figure 4:
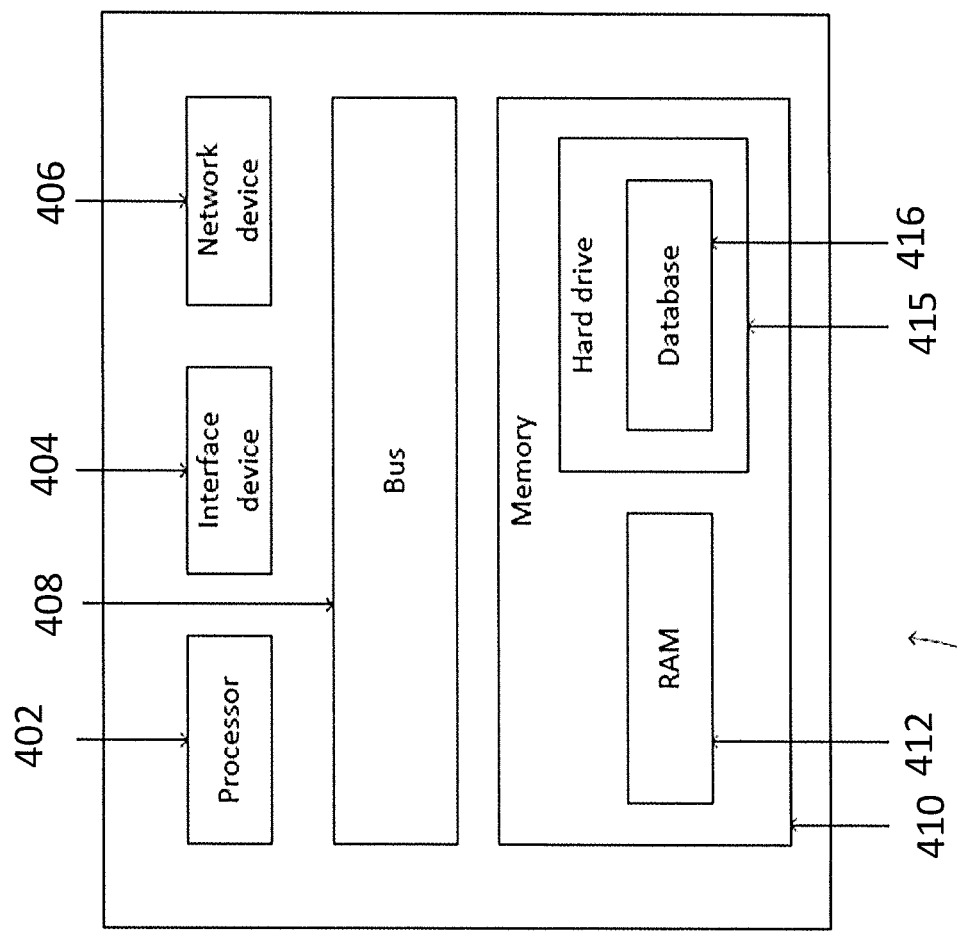
FIG. 4 depicts an example computing device as might be practiced with the one or more embodiments described herein.
Figure 5:
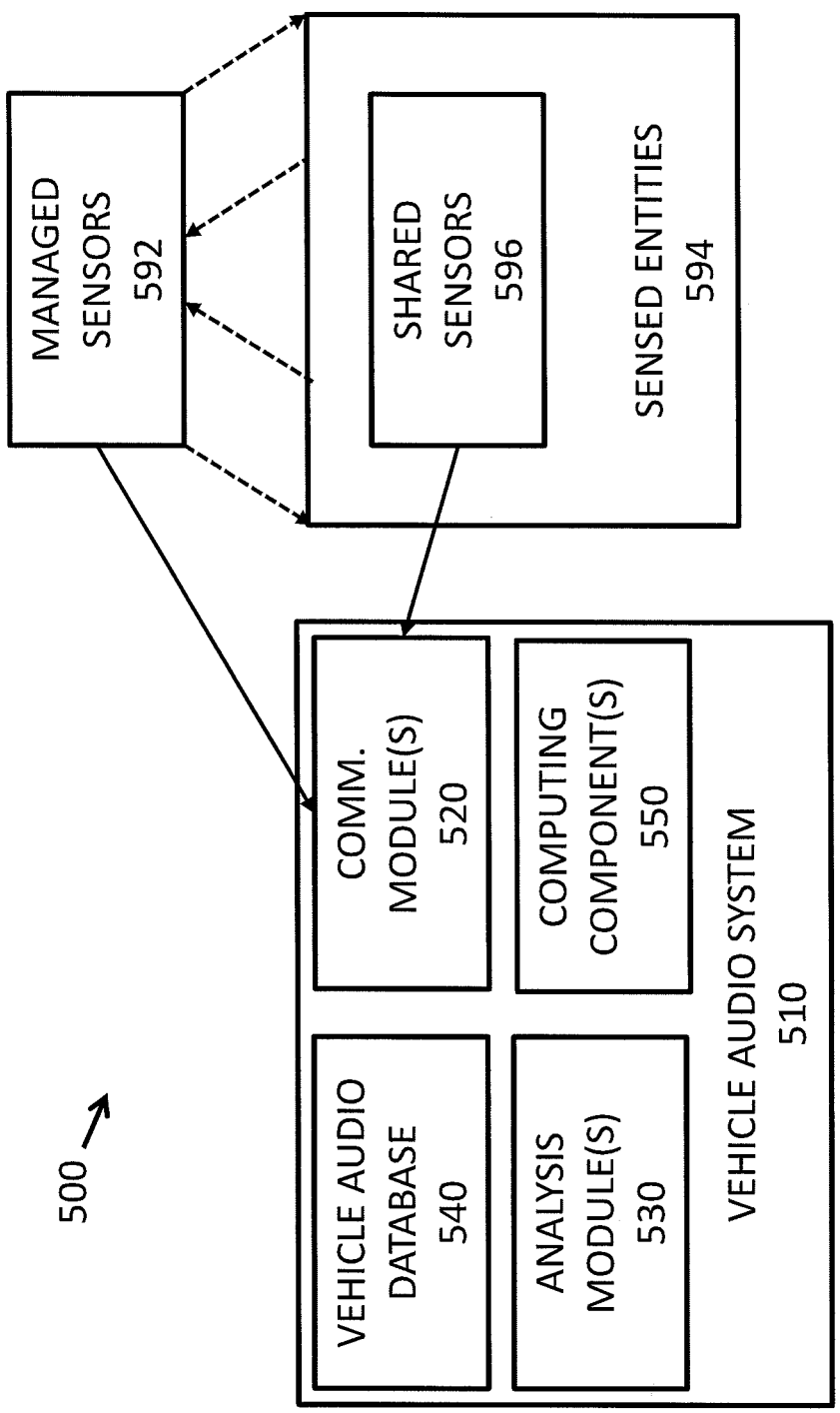
FIG. 5 illustrates a block diagram of an example system disclosed herein.

Referring to FIG. 4, illustrated therein is an example embodiment of a computing device as might be used when utilizing the systems and methods described herein. In one embodiment, computing device 400 includes memory 410, a processor 402, an interface device 404 (e.g., mouse, keyboard, monitor), a network device 406. Memory 410 in one example comprises a computer-readable signal-bearing medium. One example of a computer-readable signal-bearing medium comprises a recordable data storage medium, such as a magnetic, optical, biological, and/or atomic data storage medium. In another example, a computer-readable signal-bearing medium comprises a modulated carrier signal transmitted over a network coupled with a system, for instance, a telephone network, a local area network ("LAN"), the Internet, and/or a wireless network. In one example, memory 410 includes a series of computer instructions written in or implemented with any of a number of programming languages, as will be appreciated by those skilled in the art.

Memory 410 in one example includes RAM 412, hard drive 415, which may include database 416. Database 416 in one example holds information, such as information that relates to users and/or parties interacting with a system.

FIG. 5 illustrates an example system 500 for implementing aspects disclosed herein. FIG. 5 includes vehicle audio system 510 and managed sensors 592 for sensing, e.g., audio data related to sensed entities 594.

Managed sensors 592 can include various sensors or collectors for sensing aspects relating to vehicles, pedestrian traffic, and other things. Managed sensors 592 can be part of vehicle audio system 510, separate from but managed by vehicle audio system 510, or third party collectors to which vehicle audio system 510 has at least partial access. Managed sensors 592 can include one or more microphones.

Microphones can be directional and provide rich audio information accompanied by metadata relating to direction and other non-audio characteristics which can be used in analysis of the audio. In embodiments corroborating sensors can be used to provide additional metadata accompanying the audio. Corroborating sensors can include other microphones, cameras, magnetic field sensors, radar, sonar, lasers, et cetera. Corroborating sensors can be located at the same location as a microphone (or other sensor) or other locations.

Sensed entities 594 can include, but are not limited to, vehicles. Sensed entities can be sensed based on sound created or emitted. In embodiments sensed entities are sensed according to other characteristics, profiles, or techniques.

Sensed entities 594 can include or be associated with various shared sensors 596. Shared sensors 596 can provide additional sensor data to vehicle audio system 510 to create or supplement data in vehicle audio database 540. Shared sensors 596 can include, but are not limited to, user or driver mobile devices, Internet-of-Things (IoT) devices, and sensors aboard the car itself. Additional data provided can include, but is not limited to, additional audio from different locations or perspectives, vehicle diagnostics, location or movement data, et cetera.

Vehicle audio system 510 receives data from managed sensors 592 and/or shared sensors 596 via communication modules 520. Received data is provided to analysis module 530 for analysis. Communication module 520 can provide notifications or data to a variety of parties, such as insurers, police, emergency services, vehicle enthusiasts or hobbyists, drivers or owners of vehicles, advertisers, and others. In embodiments, communication module 520 can also transmit stored audio data to devices or systems which simulate real-world vehicle sounds to emulate the noise of a particular vehicle or configuration.

Analysis module 530 can include a number of subcomponents or modules for analyzing received audio data, and, in embodiments, accompanying metadata.

In an embodiment, a comparator module is included in analysis module 530 for comparing received audio and metadata with stored audio and metadata. In embodiments, statistical analyses can be performed by the comparator module. Different categories of data can be used when comparing received data and stored data. One category can be vehicle data for comparing particular makes and models of vehicles. Another category can include vehicle component data for comparing particular stock or aftermarket parts for vehicles. Another category can include condition data, which can include data related to vehicle condition (e.g., damage) and/or environmental conditions (e.g., temperature or humidity) which can be assessed to perform diagnostics, correct or augment received audio, or both.

In embodiments, an audio correction module can be included in analysis module 530. The audio correction module can perform various actions on received audio, such as filtering or squelching noise or other sounds, changing audio levels, normalizing audio, et cetera. In this fashion, audio can be prepared for more accurate comparison.

In embodiments, a diagnostic module can be included in analysis module 530. Diagnostic module can utilize results from other analysis (e.g., vehicle and condition comparisons) to diagnose a vehicle issue (e.g., failing belt, tire with slow air leak). Diagnostics can compare stored data previously developed for the same vehicle to determine changes over time (e.g., a slow leaking tire that gradually begins to exhibit sounds associated with a flat). In an embodiment, the diagnostic module can interact with communication module 520 to notify a vehicle owner or operator, or a third party, regarding the issue.

In embodiments, one or more of a statistical component or a machine learning component can be included in analysis module 530. A statistical component can perform statistical modeling to predict, interpret, interpolate, solve, or otherwise determine vehicle audio trends, changes, conditions, or identities in the presence of varying parameters (e.g., direction, distance, noise, temperature, humidity, pressure, et cetera). A machine learning component can utilize machine learning to discover and train systems to compare and determine vehicle identities or conditions in the presence of varying parameters.

Vehicle audio system 510 can also include computing components 550, which can include hardware and/or software, including aspects of system 400 discussed herein, and/or other software elements to provide a computing environment and computing architectural support for the aspects described herein.

The terms "engine" and "module" denote a functional operation that may be embodied either as a stand-alone component or as an integrated configuration of a plurality of subordinate components. Thus, engines and modules may be implemented as a single engine/module or as a plurality of engine/modules that operate in cooperation with one another. Moreover, engines/modules may be implemented as software instructions in memory 410 or separately in any of hardware (e.g., electronic circuitry), firmware, software, or a combination thereof. In one embodiment, engines/modules contain instructions for controlling processor 402 to execute the methods described herein. Examples of these methods are explained in further detail herein.

The techniques described herein are example, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

Although the systems and methods of the subject invention have been described with respect to the embodiments disclosed above, those skilled in the art will readily appreciate that changes and modifications may be made thereto without departing from the spirit and scope of the subject invention.

What is claimed is:

1. A system, comprising:
   a communication module for receiving new audio segments and new metadata from a plurality of sensors, wherein the plurality of sensors includes an audio sensor for collecting the new audio segments and a corroborating sensor for collecting the metadata, wherein the new audio segments include sound of a vehicle operating, wherein at least one of the plurality of sensors is located on the vehicle, and wherein at least one of the plurality of sensors is a shared sensor not located on the vehicle, and wherein the shared sensor is configured to provide at least a portion of the new audio segments different from the new audio segments collected by the at least one of the plurality of sensors located on the vehicle;
   an analysis module configured to analyze the new audio segments; and
   a comparator module configured to compare the new audio segment with stored audio segments of an audio database, wherein the audio database stores the stored audio segments and stored metadata, and wherein comparison determines a closest match and deviations between the new audio segment and the closest match, and
   wherein the analysis module determines a condition of the vehicle associated with the deviations.

2. The system of claim 1, further comprising the plurality of sensors for collecting the new audio segments or the new metadata.

3. The system of claim 2, wherein the audio sensor of the plurality of sensors includes a microphone.

4. The system of claim 2, wherein the corroborating sensor of the plurality of sensors includes one or more of a camera, a magnetic field sensor, a radar, or a sonar.

5. The system of claim 1, wherein the shared sensor is one of a mobile device of an operator of another vehicle or an Internet-of-Things device not located on the vehicle.

6. The system of claim 1, wherein the communication module is configured to communicate with at least one of emergency services, a vehicle owner, a vehicle operator, an insurer, an advertiser, or a third party.

7. The system of claim 1, further comprising a machine learning module of the analysis module configured to determine an identity or condition based on varying parameters between the new metadata and the metadata.

8. The system of claim 1, wherein the comparator module utilizes categories of data including a vehicle make and model category, a vehicle parts category, and a vehicle condition category.

9. The system of claim 1, wherein the condition is an environmental condition in which the vehicle is operating.

10. The system of claim 1, further comprising:
    a correction module configured to augment the new audio segment based on a metadata parameter, wherein analysis of the new audio segments is based on augmentation by the correction module.

11. A method, comprising:
    receiving, by a communication module, new audio segments and new metadata from a plurality of sensors, wherein the plurality of sensors includes an audio sensor for collecting the new audio segments and a corroborating sensor for collecting the metadata, wherein the new audio segments include sound of a vehicle operating, wherein at least one of the plurality of sensors is a shared sensor not located on the vehicle, and wherein the shared sensor is configured to provide at least a portion of the new audio segments different from the new audio segments collected by the at least one of the plurality of sensors located on the vehicle;
    analyzing, by an analysis module configured, the new audio segments; and
    comparing, by a comparator module configured, the new audio segment with stored audio segments of an audio database, wherein the audio database stores the stored audio segments and stored metadata, and wherein comparison determines a closest match and deviations between the new audio segment and the closest match, and
    determining, by the analysis module, a condition associated with the deviations.

12. The method of claim 11, wherein the condition is an environmental condition in which the vehicle is operating.

13. The method of claim 11, wherein the corroborating sensor of the plurality of sensors includes one or more of a camera, a magnetic field sensor, a radar, or a sonar.

14. The method of claim 11, further comprising:
    augmenting, by a correction module configured, the new audio segment based on a metadata parameter, wherein analysis of the new audio segments is based on augmentation by the correction module.

15. A non-transitory computer readable medium storing instructions, that when executed, cause:
    receiving, by a communication module, new audio segments and new metadata from a plurality of sensors, wherein the plurality of sensors includes an audio sensor for collecting the new audio segments and a corroborating sensor for collecting the metadata, wherein the new audio segments include sound of a system operating, wherein at least one of the plurality of sensors is a shared sensor not located on the system, and wherein the shared sensor is configured to provide at least a portion of the new audio segments different from the new audio segments collected by the at least one of the plurality of sensors located on the system;

analyzing, by an analysis module configured, the new audio segments; and comparing, by a comparator module configured, the new audio segment with stored audio segments of an audio database, wherein the audio database stores the stored audio segments and stored metadata, and wherein comparison determines a closest match and deviations between the new audio segment and the closest match, and determining, by the analysis module, a condition associated with the deviations.

16. The non-transitory computer readable medium of claim 15, wherein the comparator module utilizes categories of data including a system make and model category, a system parts category, and a condition category.

17. The non-transitory computer readable medium of claim 15, wherein the communication module is configured to communicate with at least one of emergency services, a system owner, a system operator, an insurer, an advertiser, or a third party.

18. The non-transitory computer readable medium of claim 15, further comprising:

augmenting, by a correction module configured, the new audio segment based on a metadata parameter, wherein analysis of the new audio segments is based on augmentation by the correction module.

19. The non-transitory computer readable medium of claim 15, wherein the corroborating sensor of the plurality of sensors includes one or more of a camera, a magnetic field sensor, a radar, or a sonar.

* * * * *